H. G. GOULD.
TOY.
APPLICATION FILED FEB. 10, 1919.
1,306,111.
Patented June 10, 1919.
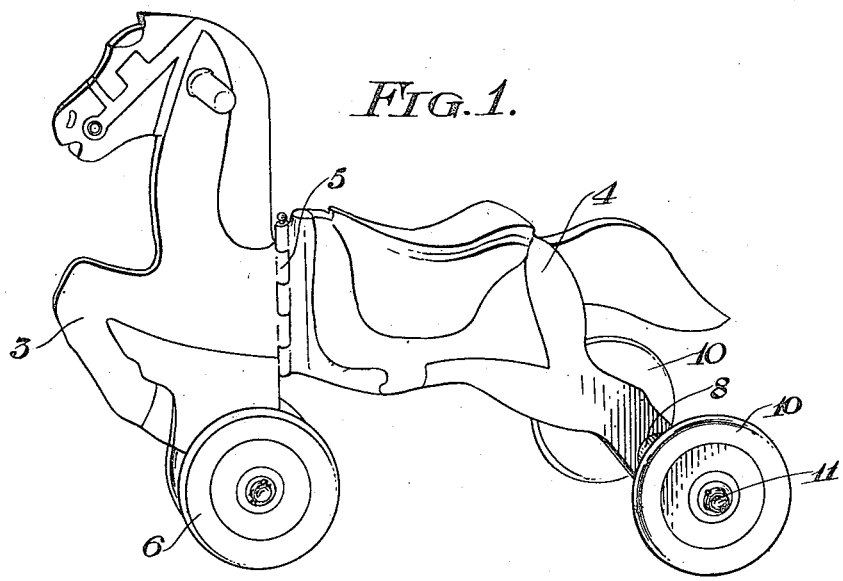
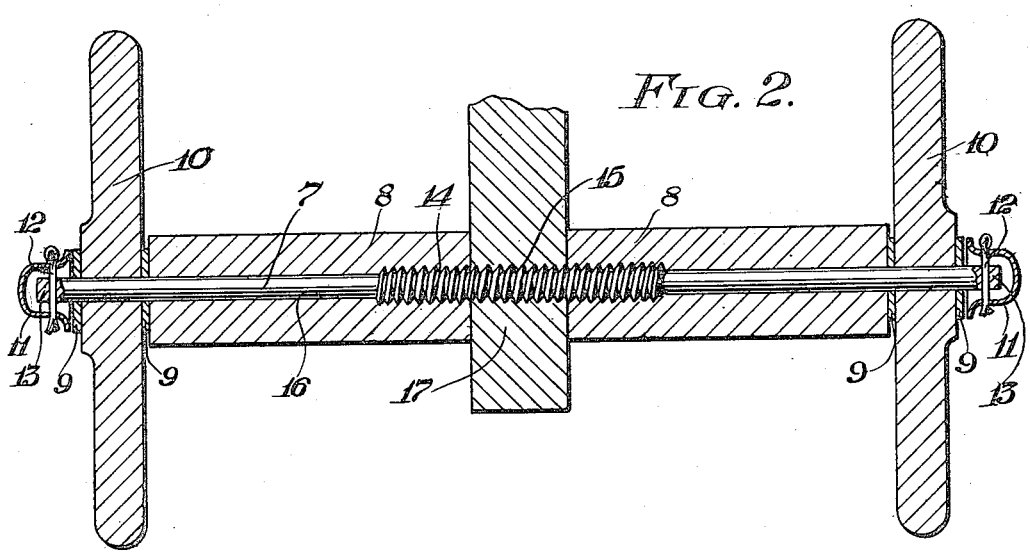
WITNESSES.
C. L. Waal
H. D. Chase
INVENTOR.
Harry G. Gould,
By R. S. Caldwell
ATTORNEY.

UNITED STATES PATENT OFFICE.

HARRY G. GOULD, OF OSHKOSH, WISCONSIN, ASSIGNOR TO GOULD MANUFACTURING COMPANY, OF OSHKOSH, WISCONSIN, A CORPORATION OF WISCONSIN.

TOY.

1,306,111. Specification of Letters Patent. Patented June 10, 1919.

Application filed February 10, 1919. Serial No. 276,154.

*To all whom it may concern:*

Be it known that I, HARRY G. GOULD, a citizen of the United States, and resident of Oshkosh, in the county of Winnebago and State of Wisconsin, have invented new and useful Improvements in Toys, of which the following is a description, reference being had to the accompanying drawings, which are a part of this specification.

This invention relates to toys, and more particularly to an axle construction for wheeled toys.

One of the objects of this invention is to provide an axle construction which consists of few parts easily assembled together and strong and durable in construction.

Another object of the invention is to provide an axle construction in which the parts which serve to secure the axle to the body of the toy also reinforce the axle.

Another object of the invention is to provide clamping members mounted on the axle and movable into clamping engagement with a part of the vehicle body.

The invention further consists in the several features hereinafter set forth and more particularly defined by claims at the conclusion hereof.

In the drawings:

Figure 1 is a perspective view of a child's vehicle provided with the axle construction embodying the invention; and, Fig. 2 is a vertical sectional view through the rear axle of the toy shown in Fig. 1.

In the drawings I have shown a child's vehicle in which the body of the vehicle is in the form of a toy horse having a front section 3 and rear section 4 secured together by a hinge 5. The front section is supported by wheels 6 which are mounted on a bolt passing through said section. The rear section is supported by the axle and wheel construction embodying the invention.

This axle and wheel construction embodies a metal rod or axle 7, clamping members 8, washers 9 mounted on the rod, wheels 10 mounted upon the ends of the rod between the washers, and hub caps 11 secured to the axle adjacent the outside washers by cotter pins 12 passing through said caps and apertures 13 in the axle.

The axle 7 is of metal and has an intermediate threaded portion 14 which is screwed, or it may be passed through, an aperture 15 in the body part of the section 4 so that portions of the thread extend on either side of said body part.

The clamping members 8 which are preferably of wood and of a length to reinforce that portion of the axle between the body part and the adjacent wheel are each provided with a bore 16 which at its inner end is screwed onto the threaded portion of the axle. These clamping members 8 are screwed up on the axle so as to tightly clamp the interposed body part 17 between them and thus serve as a clamp and a reinforcement for the axle.

In assembling the axle in the vehicle, one of the members 8 is screwed up onto the axle 7, then the axle is screwed onto, or it may be passed through, the leg of the horse or the body part of the vehicle, and the other member 8 is put on the rod and then both members 8 are screwed tightly against the leg, after which the wheels are mounted on the axle.

What I claim as new and desire to secure by Letters Patent is:

1. In a wheeled toy, the combination, with the body, of an axle passing through a part of said body and provided with threaded portions, wooden clamping members mounted on said axle and screwable upon said threaded portions into clamping engagement with said body part, and wheels mounted on the ends of the axle, said members surrounding those portions of the axle between the body part and the wheels.

2. In a wheeled toy, the combination, with a body, of an axle passing through a part of said body and provided with threaded portions, clamping members mounted on said axle and screwable upon said threaded portions into clamping engagement with opposite sides of said body part to fixedly secure the axle thereto, and wheels journaled on the ends of the axle.

In testimony whereof, I affix my signature, in presence of two witnesses.

HARRY G. GOULD.

Witnesses:
GEO. HENKEL,
AUSTIN L. BARNEY.